United States Patent [19]
DuBell

[11] 4,157,012
[45] Jun. 5, 1979

[54] GASEOUS FUEL DELIVERY SYSTEM

[75] Inventor: Thomas L. DuBell, Maineville, Ohio

[73] Assignee: General Electric Company, Cincinnati, Ohio

[21] Appl. No.: 780,691

[22] Filed: Mar. 24, 1977

[51] Int. Cl.² ............................................. F02C 7/22
[52] U.S. Cl. .......................... 60/39.46 G; 60/39.46 P; 60/39.74 B; 239/533.7; 239/533.9; 239/571; 431/89; 137/513.7
[58] Field of Search .................. 60/39.74 R, 39.74 B, 60/39.46 G, 39.46 P; 137/513.3, 513.5, 513.7; 239/533.7, 533.9, 570, 571; 431/19, 89

[56] References Cited
U.S. PATENT DOCUMENTS

| | | | |
|---|---|---|---|
| 1,657,395 | 1/1928 | Held | 123/32 R |
| 2,376,383 | 5/1945 | Richards | 431/89 |
| 2,636,553 | 4/1953 | Ballantyne | 60/39.74 B |
| 2,884,758 | 5/1959 | Oberle | 60/39.46 P |
| 2,907,527 | 10/1959 | Cummings | 60/39.74 |
| 2,930,572 | 3/1960 | Hursen | 137/513.3 |
| 3,042,064 | 7/1962 | Pommersheim | 137/513.3 |
| 3,118,494 | 1/1964 | Yost et al. | 431/89 |
| 3,154,095 | 10/1964 | Cleminshaw et al. | 137/469 |
| 3,925,003 | 12/1975 | Kutler et al. | 431/89 |
| 3,991,561 | 11/1976 | Leto | 60/39.74 B |

*Primary Examiner*—Robert E. Garrett
*Attorney, Agent, or Firm*—Henry J. Policinski; Robert C. Lampe, Jr.; Derek P. Lawrence

[57] ABSTRACT

In a gaseous fuel delivery system for delivering gaseous fuel to the combustor of a gas turbine engine wherein the delivery system includes a fuel injector having a nozzle orifice, a gaseous fuel supply passage providing fluid communication between the nozzle orifice and a source of gaseous fuel under pressure, an improvement is presented comprising means for preventing pressure perturbations occurring within said combustor from compressing gaseous fuel in at least a portion of the fuel delivery system.

17 Claims, 3 Drawing Figures

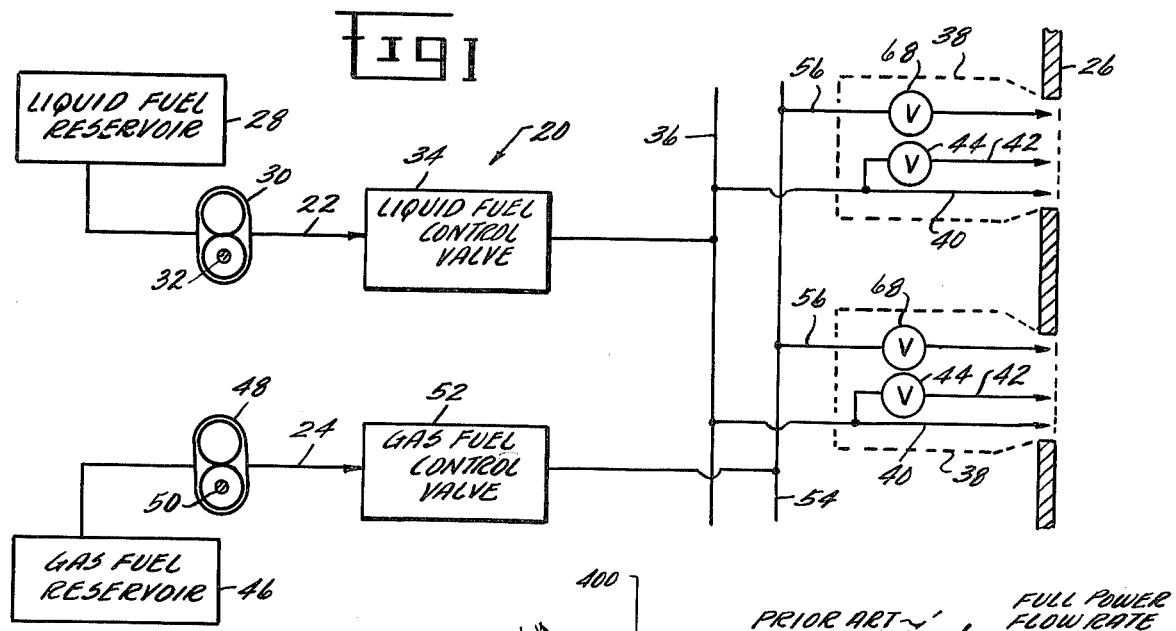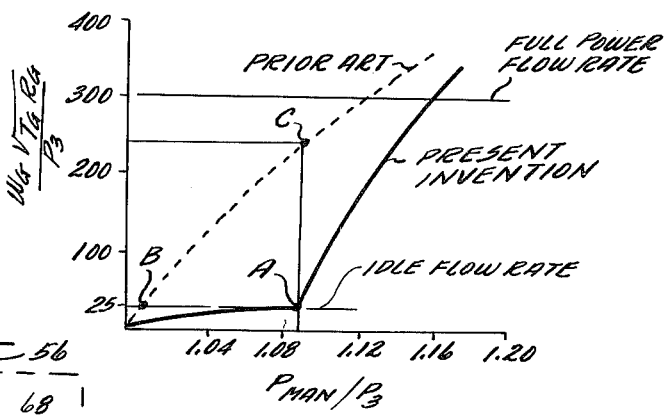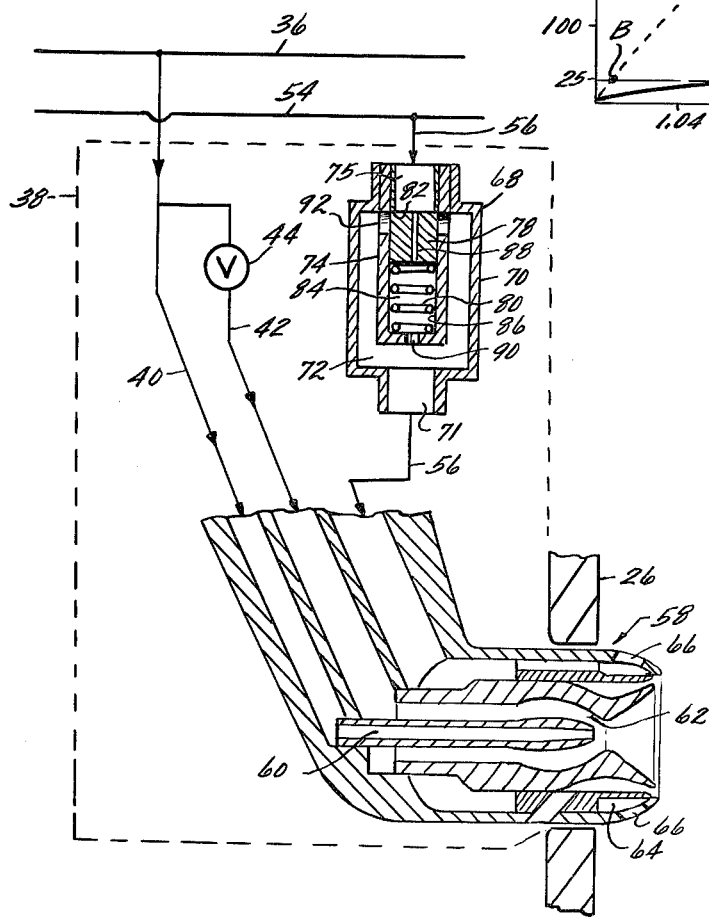

GASEOUS FUEL DELIVERY SYSTEM

BACKGROUND OF THE INVENTION

This invention relates to a fuel delivery system for supplying fuel to the combustor of a gas turbine engine and, more particularly, to apparatus for protecting the components of the system from the effects of pressure perturbations occurring within the combustor.

Some modern-day gas turbine engines are being adapted to operate on either gas or liquid fuels or combinations of both. Such capability provides the engine with the versatility to utilize the most economical fuel available at the specific geographical location of the gas turbine engine. Since many of these engines were originally designed for operation solely on liquid fuels, in order to minimize conversion costs, the adaption required to provide dual fuel capability has been accomplished within the design constraints associated with the liquid systems. By way of example, the gas fuel system must be compatible with available supply pressure pump apparatus and the fuel delivery schedule associated with the existing fuel control valve.

One particular problem associated with introducing gas flow operation compatible with liquid fuel system design constraints is gas flow dynamic instability and resonance caused by pressure perturbations occurring within the gas turbine engine combustor. This problem is particularly acute at low flow rates of gaseous fuel into the combustor. More specifically, energy released by the burning fuel within the combustor causes pressure waves or pressure perturbations which effect subsequent delivery of gaseous fuel into the combustor. At low flow rates the gaseous fuel within the fuel delivery system is at a relatively low pressure which is close in magnitude to the nominal pressure within the combustor. The pressure perturbations within the combustor in some instances create transient pressures higher than the pressure of the gaseous fuel within the delivery system. The pressure waves momentarily interrupt the flow of gaseous fuel into the combustor by compressing and storing the gaseous fuel within the delivery system. It has been found that the gaseous fuel is compressed as far upstream as the gaseous fuel manifold which, having substantial volume, can store a significant amount of gaseous fuel at an abnormally high pressure. When the pressure perturbation ceases due to the fuel flow stoppage, the compressed gaseous fuel within the delivery system is at a pressure substantially higher than the nominal pressure in the combustor and hence the gaseous fuel is released into the combustor at a momentarily high flow rate which, in turn, subsequently causes another pressure perturbation to occur within the combustor. This process is repeated again and again at a high rate of repetition causing a phenomenon known as dynamic instability, resonance or chugging which may result in substantial damage to the components of the gas turbine engine.

The above-described phenomenon does not occur with liquid fuel systems since liquids are nearly incompressible nor does the phenomenon occur with gaseous fuels under high flow rate conditions since the pressure of the gas within the fuel delivery systems is higher in magnitude than the magnitude of the pressure perturbations occurring within the combustor. The present invention is addressed to overcoming the effect of pressure perturbations within the combustor in a gaseous fuel delivery system under low flow rate conditions. Such conditions can occur when a dual fuel gas turbine engine is operated with a combination of liquid and gaseous fuels simultaneously, or when operating on gaseous fuels at low engine power.

SUMMARY OF THE INVENTION

Accordingly, it is an object of the present invention to provide apparatus for preventing damage to the components of a gas turbine engine caused by pressure perturbations within the combustor.

It is another object of the present invention to provide apparatus which isolated various components of a gaseous fuel delivery system from the effects of pressure perturbations within the combustor.

Briefly stated, these and other objects of the present invention which will become apparent from the following detailed description and accompanying drawings are accomplished by the present invention which, in one form, provides means for preventing pressure perturbations occurring within a combustor of a gas turbine engine from compressing gaseous fuel in at least a portion of the fuel delivery system associated with the engine. The preventing means may be comprised of restrictor means disposed within a gaseous fuel supply passage upstream of a nozzle orifice adapted to spray fuel into the combustor. The restrictor means maintains at least a predetermined magnitude of gaseous fuel pressure upstream of the restrictor means. The preventing means may also include by-pass means for selectively by-passing the gaseous fuel around the restrictor means in response to a preselected condition.

DESCRIPTION OF THE DRAWINGS

While the specification concludes with claims particularly pointing out and distinctly claiming the subject matter which is regarded as part of the present invention, the invention will be more fully understood from the following description of the preferred embodiments which are given by way of example with the accompanying drawings wherein:

FIG. 1 is a schematic block diagram of a fuel delivery system incorporating the present invention;

FIG. 2 is a partial view of a portion of the fuel delivery system depicted in FIG. 1; and FIG. 3 is a graph depicting flow characteristics as a function of pressure ratio for a prior art system and the system comprising the present invention.

DESCRIPTION OF THE PREFERRED EMBODIMENT

Referring now to FIG. 1, a schematic diagram of the dual fuel delivery system comprising the present invention shown generally at 20 is depicted. Dual fuel delivery system 20 is comprised of a liquid fuel circuit 22 adapted to deliver fuel in parallel fashion with a gaseous fuel circuit 24 to a gas turbine engine combustor 26, a portion of which is schematically shown in FIG. 1. Dual fuel delivery system 20 is adapted to provide fuel to combustor 26 in one of three modes; liquid fuel only, gaseous fuel only or in a combination of gaseous and liquid fuels. The aforementioned three-mode capability permits the gas turbine engine to operate using the fuel most economically available at the location site of the engine.

Interposed in liquid fuel circuit are a liquid fuel reservoir 28, liquid fuel pump 30 driven by the drive shaft 32 connected through appropriate gears (not shown) to a power output of the gas turbine engine, liquid fuel control valve 34, liquid fuel manifold 36 and a plurality of fuel injectors 38, only two of which are shown. Liquid fuel from reservoir 28 is pressurized by pump 30 and delivered to fuel control valve 34 which meters the delivery of fuel to manifold 36 in response to engine requirements for specified thrust or speed outputs. Manifold 36 delivers pressurized fuel to the plurality of liquid fuel injectors 38 which could typically be thirty in number in a modern gas turbine engine and which are adapted to spray fuel into combustor 26.

Injectors 38 are adapted to deliver liquid fuel to combustor 26 through primary passageway 40 and secondary passageway 42 disposed within injectors 38. A flow divider 44 valve well known in the art divides the fuel received from liquid fuel control valve 34 into primary flow through passageway 40 and secondary flow through passageway 42 for the purpose of effecting desired spray patterns at high and low liquid flow rates. Flow divider valves 44 are necessary in liquid fuel delivery systems wherein it is desired to provide specific spray patterns of liquid fuel over a wide range of liquid fuel flow rates. Under such circumstances, single nozzle fuel injectors are not sufficient to provide the desired spray patterns due to the incompressibility of liquid fuels.

Interposed within gaseous fuel circuit 24 are gaseous fuel reservoir 46, gaseous fuel control valve 52, gaseous fuel manifold 54 and plurality of gaseous fuel injectors 38. The engine may also include a gas fuel boost pump 48 which may be driven by the engine or by an auxiliary power system through the shaft 50. Gaseous fuel from reservoir 46 is delivered to fuel control valve 52 which delivers fuel to injectors 38 at metered rates determined in accordance with engine power or speed requirements. Typically gaseous fuel manifold 54 has substantial fluid flow path length in order to distribute fuel to all of the plurality of injectors 38 disposed uniformly around the combustor which may have a diameter up to and exceeding three feet. This expanse of manifold 54 provides an internal chamber of large volume capable of storing a large volume of compressed gaseous fuel.

Injectors 38 are adapted to deliver gaseous fuel to combustor 26 through a gaseous fuel passage 56 in which isolating or valve means 68 is disposed for the purpose of preventing dynamic instability of the gas flow through the delivery system 20. More specifically, valve means 68 serves to prevent pressure perturbations occurring within the combustor 26 from compressing gaseous fuel in that portion of gaseous fuel circuit 24 upstream of valve means 68.

Referring now to FIG. 2, a view depicting the present invention is presented schematically with a portion 58 of a typical injector 38 included. Tip portion 58 of injector 38 includes a primary liquid fuel flow nozzle 60 in fluid communication with primary passageway 40. Secondary nozzle 62 is arranged circumferentially surrounding nozzle 60 and is in fluid communication with secondary passageway 42. A third nozzle 64 adapted to spray gaseous fuel into combustor 26 is disposed circumferentially surrounding nozzle 62 and includes a plurality of nozzle orifices or apertures 66 through which gaseous fuel is sprayed into combustor 26. Nozzle 64 is in fluid communication with gaseous fuel passageway 56. Means 68 is disposed within passageway 56 such that all gaseous fuel sprayed into the gas turbine combustor must first pass through means 68.

Valve means 68 is comprised of a cylindrical housing portion 70 which is adapted to form an internal cylindrical chamber 72 in fluid communication with gaseous fuel passageway 56. Housing 70 may be separate from injector 38 or may be an integral part thereof and includes a fluid outlet 71. Projecting into chamber 72, generally cylindrical valve cage member 74, having a fluid inlet 75, entraps valve means, comprised of valve head 78 and spring 80. Valve head 78 is adapted to translate within a cylindrical cavity 84 formed by the interior cylinder wall 86 of cage member 74. Valve head 78 is selectively maintained in sealing engagement with valve seat 82 by spring 80. Under low flow conditions, all of the gaseous fuel flowing in passageway 56 flows sequentially through fluid inlet 75, restricted passageway 88 in valve head 78, into cavity 84, through apertures 90 in cage member 74, into chamber 72, through fluid outlet 71 and back into gaseous fuel passageway 56. Under low flow rate conditions, the pressure of the gaseous fuel is not sufficient to overcome the bias of spring 80 and hence valve head 78 remains in sealing engagement with valve seat 82. The low flow rate condition described above principally is encountered when the gas turbine is operating simultaneously on both liquid and gaseous fuel. More specifically, a typical fuel flow split encountered in simultaneous operation is 10% gas fuel to 90% liquid fuel. Under such conditions the gaseous fuel flow is at a comparatively low rate and hence the pressure at which the gaseous fuel is delivered to the combustion chamber is low in magnitude. Consequently, pressure perturbations occurring within the combustor may result in combustion pressures which exceed the pressure of the gaseous fuel delivered to the combustor. But for valve means 68 the pressure perturbation may travel back through the tip 58, through the passageway 56 and into manifold 54 causing the gaseous fuel to compress in these elements. Since the manifold 54 may be comprised of substantial volume a substantial amount of gaseous fuel may be compressed therein. When the pressure perturbation ceases, the compressed gas is at a pressure higher than the normal delivery pressure of the gaseous fuel and consequently the gaseous fuel expands to deliver fuel into the combustion chamber at an abnormal flow rate which in turn may lead to another pressure perturbation.

Means 68 serves to isolate at least a portion of the fuel delivery system from the effect of the aforedescribed pressure perturbations and maintains compression of the gaseous fuel to a minimum. With valve means 68 disposed within the gaseous fuel supply passageway 56, the pressure perturbation is prevented from traveling upstream of the valve means 68 and hence pressure perturbations occurring within the combustor are prevented from compressing the gaseous fuel in manifold 54 which is disposed upstream of means 68. More specifically, restricted passage 88 maintains a pressure drop across means 68 such that the pressure of the gaseous fuel upstream of the means 68 is always higher than the pressure in the combustor even as increased by the pressure perturbation. Consequently, the pressure perturbation does not effect the gaseous fuel delivery circuit or system upstream of means 68.

Under high flow conditions such as those encountered when the gas turbine engine is operating solely on gaseous fuel, the fuel requirements of the engine demand a fuel flow rate exceeding the flow passing capability of restricted passageway 88. The present invention provides a plurality of by-pass passages 92 in cage member 74 for the purpose of by-passing flow of the gaseous fuel around restricted passage 88 under high flow conditions. More specifically, at a preselected pressure condition, the pressure of the gaseous fuel acting across the head of valve head 78 establishes a force which overcomes the biasing force exerted by spring 80 on valve head 78 thus unseating valve head 78 from valve seat 82 and permitting the gaseous fuel to flow into chamber 72 through by-pass passages 92 which are larger than restricted passage 88. Hence, the gaseous fuel may be delivered to the combustor at the higher flow rate demanded when the engine is operating on gaseous fuel only.

Referring now to FIG. 3, the advantages of the present invention over conventional devices may be readily observed. The dashed line depicts the flow characteristics of a conventional injector as a function of the pressure ratio of the pressure of the gaseous fuel in the manifold to the pressure in the combustion chamber. More specifically, the corrected flow rate of the gaseous fuel $(W_g\sqrt{T_gR_g}/P_3)$ is plotted as a function of $P_{man}/P_3$ where:

$W_g$ = gaseous fuel flow rate
$T_g$ = gaseous fuel temperature
$R_g$ = gas constant
$P_3$ = combustor pressure
$P_{man}$ = gaseous fuel manifold pressure.

It has been found that the pressure ratio $P_{man}/P_3$ should desirably be equal to or larger than 1.09 in order that the fuel distribution system remain insensitive to pressure perturbations within the combustor. Typically, fuel is delivered under engine idle conditions at a rate of 25 lbs/hr and hence restricted passage 88 is sized so as to maintain a minimum pressure ratio of 1.09 at 25 lbs/hr flow rate for the idle condition. The idle operating condition is designated point A in FIG. 3. Without restricted passage 88 incorporated, it is readily observed that a conventional injector exhibits a pressure ratio which is considerably less than 1.09, approximately 1.02, at the same idle condition flow rate (designated "B" in FIG. 3). It is also observed that a conventional injector will deliver gaseous fuel at rates up to 240 lbs/hr at a pressure ratio $P_{man}/P_3$ below the minimum pressure ratio necessary to avoid the effects of combustor pressure perturbations. Point C on the prior art curve indicates that the 1.09 minimum pressure ratio will not be reached with a conventional injector until the fuel flow rate is approximately 240 lbs/hr. This flow rate approaches the full power flow rate. Consequently, it may be readily appreciated that the present invention provides the required pressure ratio $P_{man}/P_3$ of 1.09 at a lower flow rate of gaseous fuel than that provided by a conventional injector.

From the foregoing, it is now apparent that a fuel delivery system has now been provided which is well adapted to fulfill the aforestated objects of the present invention and that while only one embodiment of the invention has been described for purposes of illustration, it should be understood that other equivalent forms of the invention are possible within the scope of the appended claims.

I claim:

1. In a gaseous fuel delivery system for delivering gaseous fuel to the combustor of a gas turbine engine, said system including a fuel injector having a nozzle orifice, said system further including a gaseous fuel supply passage providing fluid communication between said nozzle orifice and a source of gaseous fuel under pressure, the improvement comprising:

means for preventing pressure perturbations occurring within said combustor from compressing said gaseous fuel in at least a portion of said fuel delivery system during periods of gaseous fuel flow through said nozzle orifice.

2. The improvement as set forth in claim 1 wherein said means is comprised of valve means disposed within said supply passage upstream of said nozzle orifice for maintaining at least a predetermined magnitude of gaseous fuel pressure upstream of said valve means.

3. The improvement as set forth in claim 2 wherein said valve means maintains said predetermined magnitude of pressure for a low rate of flow of said gaseous fuel through said injector.

4. The improvement as set forth in claim 3 wherein said valve means is disposed within said injector.

5. The invention as set forth in claim 1 wherein said means is comprised of restrictor means disposed within said supply passage for maintaining at least a predetermined magnitude of gaseous fluid pressure upstream of said nozzle orifice and by-pass means for selectively by-passing said gaseous fuel around said restrictor means in response to a preselected condition.

6. The invention as set forth in claim 5 wherein said by-pass means is comprised of a by-pass passage adapted to provide a flow path for the flow of said gaseous fuel around said restrictor means and valve means adapted to selectively block the flow of said gaseous fuel through said by-pass passage.

7. The invention as set forth in claim 6 wherein said valve means blocks the flow of said gaseous fuel through said by-pass passage for a low rate of flow of said gaseous fuel through said injector.

8. The invention as set forth in claim 7 wherein said restrictor means is disposed within said injector.

9. The invention as set forth in claim 7 wherein said by-pass means is disposed within said injector.

10. The invention as set forth in claim 9 wherein said restrictor means is disposed within said injector.

11. In a fuel circuit associated with a gaseous fuel delivery system for delivering gaseous fuel to the combustor of a gas turbine engine through a nozzle orifice disposed at the circuit outlet, the improvement comprising:

means for preventing pressure perturbations occurring within said combustor from compressing said gaseous fuel in at least a substantial portion of said circuit during periods of gaseous fuel flow through said nozzle orifice.

12. The invention as set forth in claim 11 wherein said means is disposed within said fuel circuit and maintains at least a predetermined magnitude of gaseous fluid pressure in said substantial portion of said fluid circuit upstream of said means.

13. The invention as set forth in claim 12 wherein said means is comprised of valve means which maintains said predetermined pressure magnitude for a low rate of flow of said gaseous fuel through said injector.

14. The invention as set forth in claim 12 wherein said means is comprised of restrictor means disposed within said fuel circuit for maintaining said predetermined pressure magnitude and by-pass means for selectively by-passing said gaseous fluid around said restrictor means in response to a preselected condition.

15. The invention as set forth in claim 14 wherein said by-pass means is comprised of a by-pass passage adapted to provide a flow path for the flow of said gaseous fuel around said restrictor means and valve means adapted to selectively block the flow of said gaseous fuel through said by-pass passage.

16. A system for delivering gaseous fuel to the combustor of a gas turbine engine, said system comprising:
   a gaseous fuel circuit;
   means for supplying said circuit with pressurized gaseous fuel;
   a plurality of gaseous fuel injectors disposed within said circuit adapted to spray said pressurized gaseous fuel into said combustor;
   a fuel distribution manifold adapted to receive said pressurized fuel from said supply means and to distribute said pressurized fuel to said plurality of injectors; and
   means disposed in said circuit downstream of said distribution manifold for preventing pressure perturbations occurring within said combustor from compressing said gaseous fuel in said manifold during periods of gaseous fuel flow through said fuel injectors.

17. The invention as set forth in claim 16 wherein said means is comprised of restrictor means for maintaining at least a predetermined magnitude of gaseous fuel pressure in said manifold and by-pass means adapted to selectively by-pass said restrictor means in response to a preselected condition.

* * * * *